United States Patent [19]
Previati

[11] 3,967,768
[45] July 6, 1976

[54] SEALING DEVICE FOR HOT FLUID CURING UNITS

[75] Inventor: Augusto Previati, Milan, Italy

[73] Assignee: Industrie Pirelli S.p.A., Milan, Italy

[22] Filed: Jan. 22, 1974

[21] Appl. No.: 435,492

[30] Foreign Application Priority Data
Jan. 22, 1973  Italy ................................ 19414/73

[52] U.S. Cl. ............................. 226/115; 226/150; 226/162
[51] Int. Cl.² ........................................ B65H 17/36
[58] Field of Search ........... 226/150, 162, 108, 111, 226/112, 115

[56] References Cited
UNITED STATES PATENTS
2,990,091   6/1961   Goldsworthy ....................... 226/112
3,133,469   5/1964   Ljungberg ....................... 226/150 X
3,819,073   6/1974   Asselborn ....................... 226/162 X FOREIGN PATENTS OR APPLICATIONS
2,028,851   12/1970   Germany ........................... 226/162

Primary Examiner—Richard A. Schacher
Attorney, Agent, or Firm—Stevens, Davis, Miller & Mosher

[57] ABSTRACT

A sealing device for hot fluid curing units comprising a pair of telescopically slidable tubular bodies provided with means for originating a relative movement of said bodies with respect to each other and to the curing unit, the material travelling in said unit passing through said tubular bodies.

Each tubular body incorporates an expansible and collapsible ring ensuring tightness between the tubular body and the material to be treated, so that a continuous movement of the material travelling in the curing unit can be obtained.

6 Claims, 7 Drawing Figures

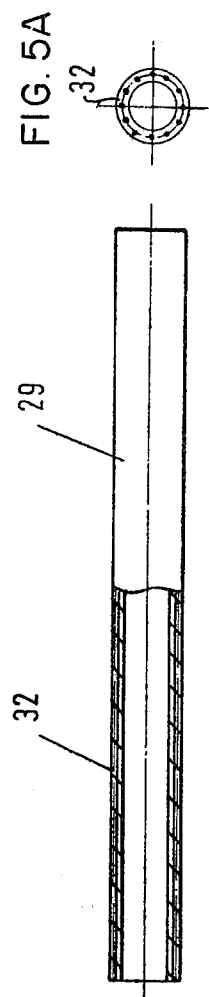
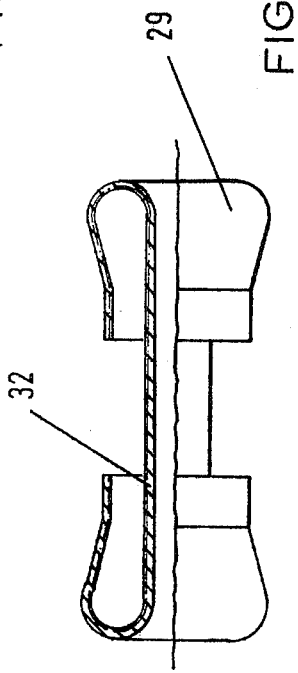

SEALING DEVICE FOR HOT FLUID CURING UNITS

The present invention relates to a sealing device for hot fluid curing units, namely for those curing units in which the curing heat is supplied by means of a hot fluid (generally water steam) which goes into direct contact with the elastomeric material being treated.

More specifically, the present invention concerns a sealing device for the hot fluid curing units used to cure continuously elongated elements of elastomeric material, such as tubes, structural shapes, sheaths for electric cables and the like.

The hot fluid curing units of the above indicated type consist practically of a tank having an inlet opening for the material to be cured, an outlet opening for the material already cured, and other openings for the supply and the discharge of the heating fluid.

Sealing devices, intended to prevent leakages of the heating fluid, are provided at the inlet and outlet openings for the material.

Various types of sealing devices against leakages of the hot fluid are already known, which act against the surface of the element to be cured while this enters the curing unit and outcomes therefrom in cured state.

Said known sealing devices comprise generally an elastic sheath, directly or indirectly fast to the inlet and outlet openings for the material, which presses against the surface of said material, namely of the tube, structural shape or the like, while said material is in movement.

According to the various sealing devices, the elastic sheath has different shapes.

In a known sealing device the elastic sheath consists of a sleeve of frusto-conical shape, which comes into friction contact with the material to be cured, while this is in movement, at the smaller base of said frusto-conical element.

In another already known sealing device, the elastic sheath consists of a toroidal chamber containing a fluid under pressure, which presses against the surface of the material to be cured, which, being in movement, slides onto it.

The conventional sealing devices already known show some disadvantages, the main of which is that they damage the surface of the material to be treated in consequence of the friction occurring between the elastic sheath, which is still, and said material to be treated, which is moving. This disadvantage has not a relevant effect on the outlet opening provided in the curing unit for the discharge of the material, because in that position said material is already cured, but is very serious at the inlet of the material in the curing unit, when said material is not yet cured.

A further disadvantage is that, in course of time, owing to the friction taking place between the material passing through the curing unit and the elastic sheaths, the latter get worn, with a consequent reduction of the sealing action and therefore leakages of heating fluid.

To restore the correct sealing, it is therefore necessary to stop the curing unit and to allow it to cool, in order to replace the elastic sheaths of the sealing devices.

These interruptions result consequently in a low output of the curing unit.

The present invention aims at providing a sealing device which is devoid of the above indicated drawbacks ascertained in the conventional sealing devices and which, if desired, permits to subject to tensions of any pre-established value the material to be cured inside the curing unit.

Accordingly, the object of the present invention is a sealing device for hot fluid curing units, comprising, at the inlet and outlet openings of the curing unit, a pair of tubular bodies, means for permitting a relative movement of said tubular bodies with respect to each other, means for tightly connecting the pair of tubular bodies to the curing unit, means incorporated in each tubular body for tightly securing in a removable manner the element to be cured, and means for moving and guiding at least one tubular body with respect to the curing unit.

The present invention will be better understood from the detailed description made by way of non-limiting example with reference to the figures of the attached sheets of drawing, in which:

FIGS. 5, 5A and 6 show an element of the particular of FIG. 4.

Figure 1:
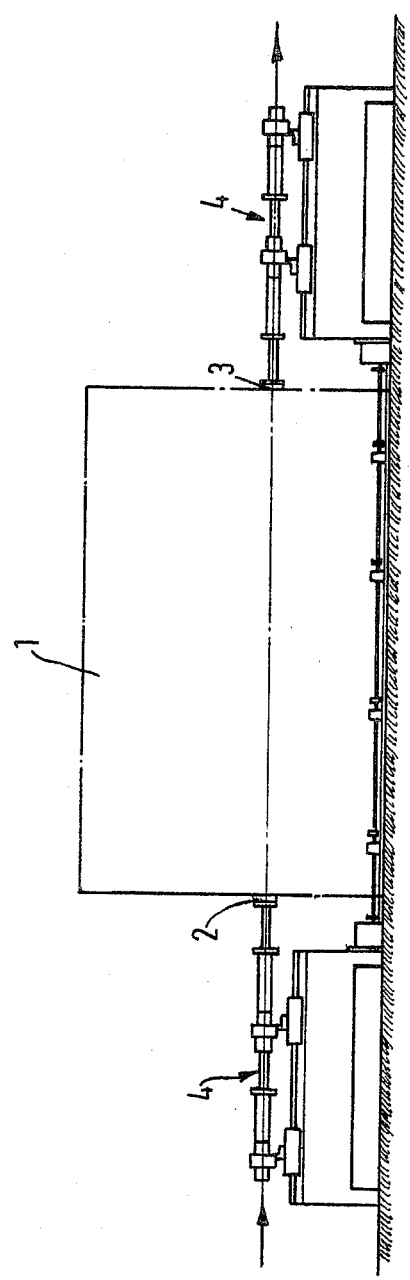
FIG. 1 shows diagrammatically a hot fluid curing unit on which sealing devices according to the invention are applied both at the inlet end and at the outlet end.

FIG. 1 illustrates diagrammatically a hot fluid curing unit, namely a curing unit constituted by a tank 1 wherein hot fluid is circulated and which is provided with openings 2 and 3, respectively intended for the inlet and the outlet of the elastomeric material to be treated.

Sealing devices 4, equal to each other, are provided at the opening 2 for the inlet of the material to be cured and at the opening 3 for the outlet of the cured material.

Figure 2:
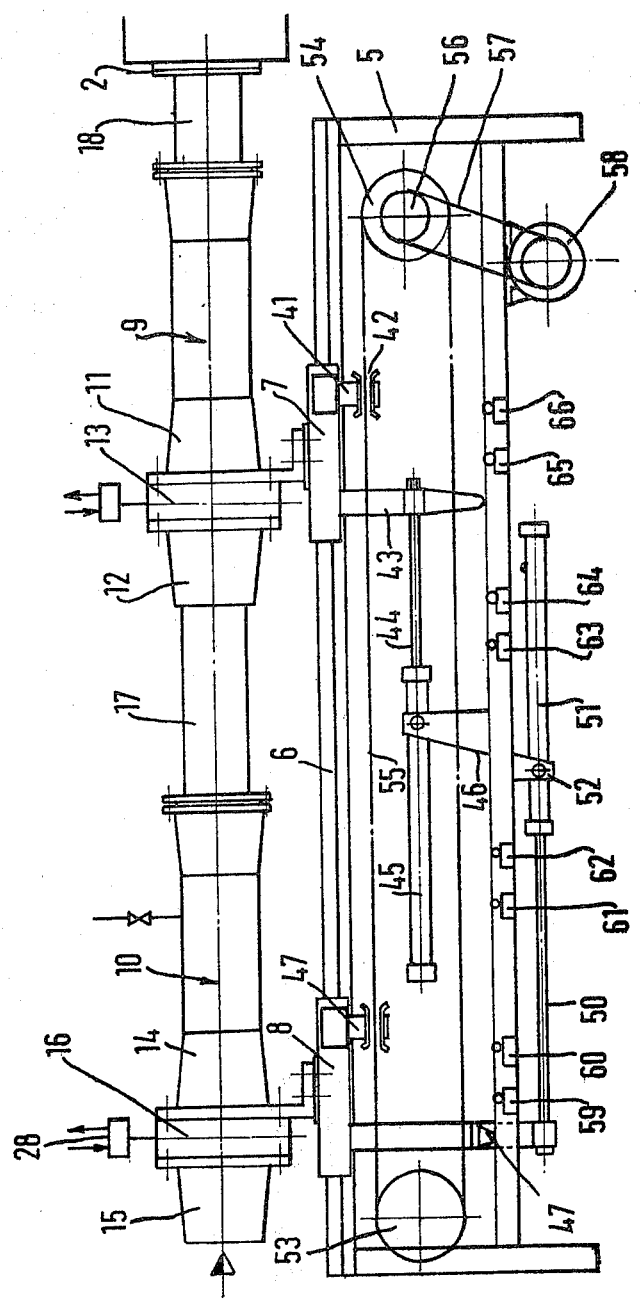
FIG. 2 shows diagrammatically a sealing device.

FIG. 2 represents diagrammatically in enlarged scale the sealing device 4 situated at the inlet opening 2 of the curing unit. Said sealing device is able to permit a continuous movement of the elastomeric material to be treated through the curing unit 1.

As it can be seen in FIG. 2, the sealing device comprises a frame 5 on the upper part of which are provided rails 6.

The rails 6 support two carriages 7 and 8 which can be slidably driven on them; the means for driving the carriages on the rails will be described herebelow.

Two tubular bodies, within which the material passes to enter the curing unit, are fast to the carriages 7 and 8. In particular, the tubular body 9 is fast with carriage 7 and the tubular body 10 is fast with carriage 8.

The tubular bodies 9 and 10 are equal to each other and are constituted by two parts joined together with the interposition of a means for tightly clamping the material which is to be conveyed to the curing unit.

More particularly, the tubular body 9 is formed by the two parts 11 and 12, between which is interposed the clamping means 13. On its turn, the tubular body 10 is formed by the two parts 14 and 15, between which is interposed the clamping means 16.

The tubular body 9, at its end directed towards the tubular body 10, carries, rigidly connected to it, for instance by welding, a portion of tube 17 which penetrates by sliding in a tight manner, with a telescopic movement, into the tubular body 10.

Moreover, said tubular body 9, at its other end, namely that directed towards the inlet opening 2 of the curing unit, receives in a slidable tight manner a portion of tube 18 rigidly connected at said opening, for instance by welding.

Figure 4:
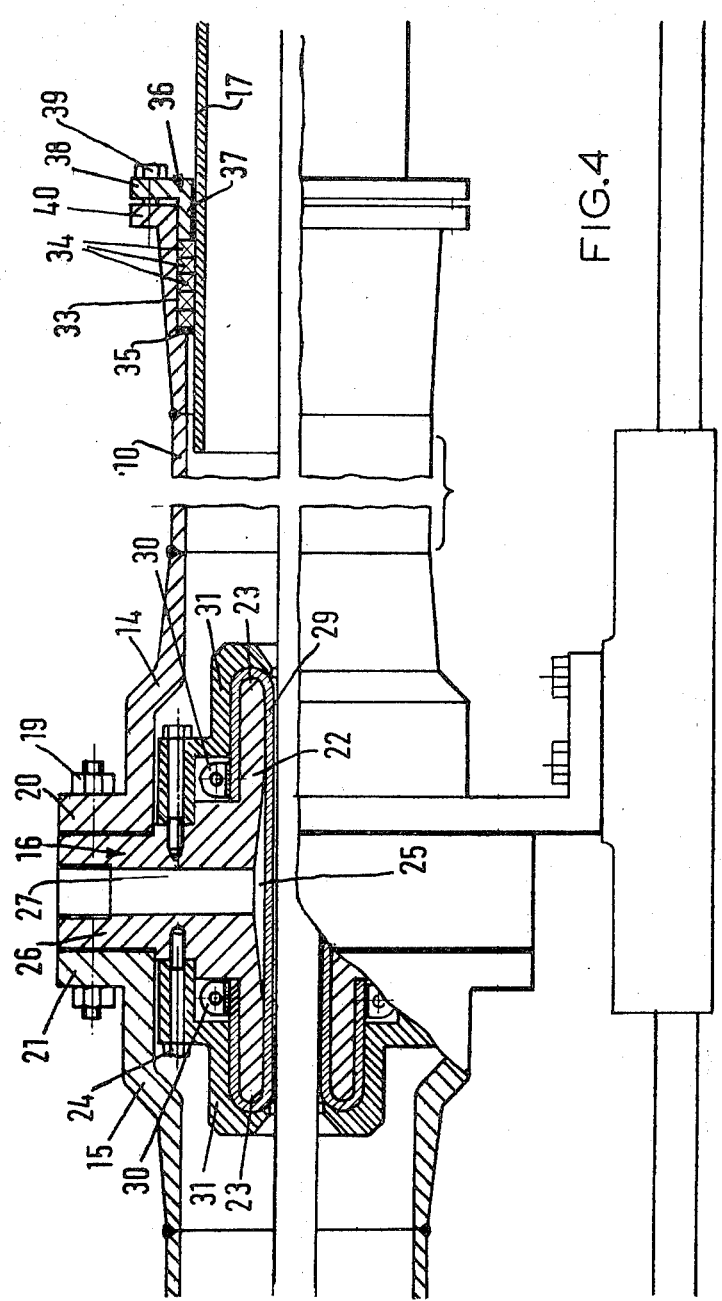
FIG. 4 shows in enlarged scale a particular of the sealing device.

As said above, the tight clamping means 13 and 16 for the material to be supplied to the curing unit are equal to each other, and FIG. 4 shows the one indicated with the reference numeral 16 in FIG. 2, which belongs to the tubular body 10.

As it can be seen in FIG. 4, the tight clamping means 16 is arranged and locked by means of bolts 19 between the flanges 20 and 21, respectively belonging to the parts 14 and 15 constituting the tubular body 10.

The tight clamping means 16 comprises a rigid sleeve 22, whose ends 23 are rounded.

Moreover, said rigid sleeve 22 has an enlargement 25 of its inner cavity, in the central portion of the latter.

The rigid sleeve 22 forms a single unit with a disc 26, and a duct 27 passes radially through the disc and the rigid sleeve, opening in the enlargment 25 of the inner cavity of the latter.

The duct 27 is in communication with means 28 (see FIG. 2) already known per se, as for instance valves, for the supply and the discharge of a fluid under pressure.

The rigid sleeve 22 contains, inserted into it, a flexible sleeve 29 in order to provide a hollow space between them.

The ends of the flexible sleeve are turned up about the ends 23 of the rigid sleeve so as to cover also the outer surface of the latter, to which they are tied by means of locking straps 30.

The part of flexible sleeve 29 turned up about the outer surface of the rigid sleeve leans against a rigid support 31 secured to the disc 26 by means of bolts 24.

The flexible sleeve 29, as illustrated in FIGS. 5 and 6, is constituted by a portion of tube of elastomeric material containing in its inside longitudinal inextensible reinforcing threads 32.

As represented in FIGS. 5 and 6, said reinforcing threads 32 are preferably arranged in proximity of the outer surface of the portion of tube of elastomeric material, so as to be near to the zone of contact between the flexible sleeve 29 and the rigid sleeve 22. The reason of this preferred arrangement will be easily understood when describing the operation of the tight clamping device.

Still as represented in FIG. 4, the sealing system, in the telescopic slidable coupling between the tubular body 10 and the portion of tube 17 is carried out in the following way.

As annular seat 33, intended to receive gaskets 34, is obtained inside the end of the tubular body 10.

The gaskets 34 lean against a step 35 and are pushed towards it by a ring 36 having an L-shaped section. Said ring 36 consists of two arms 37 and 38. Arm 37 penetrates into the tubular body 10 and abuts against the outermost gasket 34. Arm 38 is provided with holes for receiving screws 39 which engage with threaded holes obtained on a flange 40 fast outwardly with the end of the tubular body 10.

The sealing system in the telescopic slidable coupling between the tubular body 9 and the portion of tube 18 is equal to that described above, provided between the tubular body 10 and the portion of tube 17.

As said above, the carriages 7 and 8 are provided with means for moving them along the rails 6; said means are represented in FIG. 2.

As it can be seen in said figure, the carriage 7 is provided with a first appendix 41 to which is fast a clamp 42 provided with means for its own actuation. Moreover, the carriage 7 is provided with a second appendix 43 able to act on the switches of an electric circuit controlling the operation of the carriages.

The appendix 43 carries, hinged to it, the stem 44 of a fluid-dynamically (i.e. hydraulically or pneumatically) actuated cylinder/piston system 45. The cylinder/piston system 45 is connected to the frame 5 through a bracket 46.

On its turn, the carriage 8 is provided with a first appendix 47 to which is fast a clamp 48 provided with means for its own actuation. Moreover, the carriage 8 has a second appendix 49, able to act on the switches of an electric circuit controlling the operation of the carriages.

The appendix 49 carries, hinged to it, the stem 50 of a fluid-dynamically actuated cylinder/piston system 51, connected to the frame 5 through a bracket 52.

The frame 5 carries moveover, pivoted onto it, the shafts of two sprocket wheels 53 and 54 arranged at the opposite ends of said frame, and a chain 55 engages with said sprocket wheels, passing inside the clamps 48 and 42.

The shaft of the sprocket wheel 54 carries, keyed onto it, a further sprocket wheel 56 which, through a chain 57, receives motion from a motor 58 secured to the frame 5.

As said above, the sealing device is associated with an electric circuit which controls its operation, and said electric circuit (not illustrated) comprises a series of switches 59, 60, 61, 62, 63, 64, 65 and 66 fastened to a ledger of the frame 5 and actuated by the ends of the appendices 43 and 49.

The operation of the sealing device represented in FIG. 2 will now be described by starting from the position represented in said figure.

At the moment represented in FIG. 2, the motor 58 is working and transmits motion to the chain 55 through the chain 57, the sprocket wheel 56 and the sprocket wheel 54.

The chain 55 moves clockwise, the carriage 8 is still and the carriage 7 is moving to the right of FIG. 2, since the clamp 42 is closed and is therefore fast with said chain 55. Moreover the tight clamping means 13 is closed, so that it tightly clamps the material entering the curing unit.

As the carriage 7 moves, also the tubular body 9 fast with it will move; consequently the portion of tube 17 leaves the tubular body 10 while the portion of tube 18 penetrates the tubular body 9.

The motion of the carriage 7 causes its appendix 43 to actuate the switch 65. The actuation of the switch 65 originates the closure of the clamp 48 fast with the carriage 8, so that also the latter is dropped into motion, towards the right of FIG. 2, by the chain 55. Both the carriages 7 and 8 are now moving to the right and the appendix 49 of carriage 8 actuates the switch 59 which originates the closure of the tight clamping means 16 of the tubular body 10 on the material entering the curing unit.

The carriages 7 and 8 go on moving to the right and the appendix 49 of carriage 8 actuates the switch 60 which originates the opening of the tight clamping means 13 of the tubular body 9. The two carriages 7 and 8 go on moving to the right, and the appendix 43 of carriage 7 actuates the switch 66 which originates the opening of clamp 42, with a consequent disengagement of the carriage 7 from the chain 55.

At this moment the cylinder/piston system 45 enters into action, moving rapidly the carriage 7 towards the left of FIG. 2, until to bring it to a rest position, in which position the appendix 43 of carriage 7 is situated between the switches 62 and 63.

At this moment the carriage 7 is still and the carriage 8 goes on moving to the right. Said carriage 8, in its motion, actuates by means of its appendix 49 the switch 61 which originates the closure of the clamp 42 of the carriage 7, which therefore begins again to move to the right.

The carriage 7, which is now moving together with carriage 8, actuates with its appendix 43 the switch 63 which originates the closure of the tight clamping means 13 of the tubular body 9 on the material entering the curing unit.

The two carriages 7 and 8 go on moving to the right, and the appendix 43 of carriage 7 actuates the switch 64, originating the opening of the clamping means 16 of the tubular body 10 fast with the carriage 8.

Subsequently, by means of the motion of the carriages 7 and 8, the switch 62 is actuated by the appendix 49 of carriage 8. The actuation of said switch 62 opens the clamp 48 of carriage 8; the cylinder/piston system 51 enters then into action to displace rapidly to the left the carriage 8 as far as its stroke end, where the appendix 49 is at the left (in FIG. 2) of switch 59.

Now the working cycle is re-started.

To complete the description of the operation of the sealing device, description will now be made of the operation of the tight clamping means 13 and 16, equal to each other, one of which is represented in FIG. 4, whose construction details have been already indicated above.

In FIG. 4 the tight clamping means is represented in open position.

To close it, fluid under pressure is supplied, through the duct 27, in the hollow space existing between the two sleeves at the enlargement 25 of the inner cavity of the rigid sleeve 22.

The increase of pressure in said hollow space originates a radial contraction of the flexible sleeve 29, which firmly grips the elastomeric material.

To open the tight clamping means, the duct 27 is simply opened towards the outside and the pressure in the hollow space between the two sleeves is therefore lowered; this causes the radial expansion of the flexible sleeve. This radial expansion can be increased by connecting the duct 27 with a suction duct.

The radial contraction and expansion of the flexible sleeve 29 is made possible by the elasticity of the layer of elastomeric material existing between the longitudinal inextensible reinforcing threads 32 of the flexible sleeve and the contact surface of the latter with the rigid sleeve.

The influence of the layer of elastomeric material is above all important for the phase of radial expansion, taking place by opening the duct 27, which permits to exploit the elastic recovery of the compressed elastomeric material to increase the diametrical dimensions of the inner cavity of the flexible sleeve; the effect of radial expansion can be enhanced by connecting the duct 27 with a suction duct.

The amplitude of the contraction and therefore of the expansion of the flexible sleeve depends on the size of the hollow space of the rigid support 31 and on the thickness of the layer of elastomeric material existing between the threads 32 near the contact surface between the flexible sleeve and the rigid sleeve; to limit said amplitude of contraction and expansion it is preferred to keep small the thickness of the layer of elastomeric material cited above.

To this purpose, the threads 32 are situated at a small distance from the outer surface of the flexible sleeve.

On their turn, the longitudinal reinforcing threads 32 have the task of withstanding the tension stresses in the sleeve, which are imparted to it by the elastomeric material in movement.

The device illustrated in FIG. 2 permits the continuous movement of the elastomeric material to be treated in the curing unit.

Figure 3:
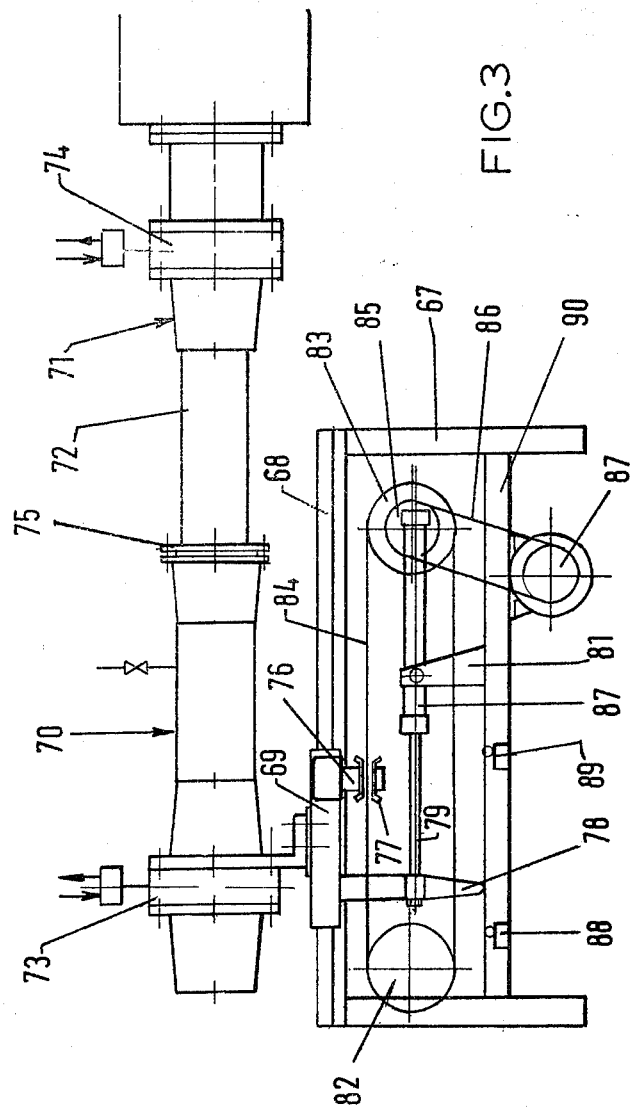
FIG. 3 shows diagrammatically a sealing device according to an alternative embodiment.

The embodiment illustrated in FIG. 3 shows instead a device, according to the present invention, which permits a discontinuous movement of the elastomeric material to be treated in a hot fluid curing unit.

As it can be seen in said FIG. 3, the sealing device comprises a frame 67 which carries in its upper part rails 68, on which a carriage 69 is slidably driven.

The carriage 69 is fast with a tubular body 70, equal to the tubular bodies 9 and 10 described with reference to the device of FIG. 2. Moreover, the device of FIG. 3 comprises a tubular body 71, rigidly connected at the opening of the curing unit (for instance the inlet opening); said body 71, at its end directed towards the tubular body 70, carries a tube 72 able to slidably penetrate in a tight manner into said tubular body 70. The tubular body 70 is provided with a tight clamping means 73 and the tubular body 71 is provided with a tight clamping means 74.

Moreover, means 75 are provided to ensure tightness in the slidable coupling between the tubular body 70 and the tube 72.

Said tight clamping means 73 and 74 and the tight means 75 in the telescopic slidable connection indicated above are equal to those represented in FIG. 4 and have already been described. For the operation of the device represented in FIG. 3, the means are carried by the frame 67.

The carriage 69 comprises a first appendix 76 to which is fast a clamp 77 provided with means for its own actuation, and a second appendix 78 able to interact at its end with the switches of an electric circuit, not represented, controlling the operation of the device.

The second appendix 78 carries, hinged to it, the stem 79 of a cylinder/piston system 80 carried by a bracket 81 belonging to the frame 67.

The operating means comprise moreover two sprocket wheels 82 and 83 pivoted with their shafts to the frame 67; a chain 84 engages with said two sprocket wheels.

Motion is imparted to the chain 84 by the sprocket wheel 83, since the shaft of the latter carries, keyed onto it, a gear 85 which receives motion, through a chain 86, by a motor 87 fastened to the frame 67.

The above described device represented in FIG. 3 is associated with an electric circuit controlling its operation; said electric circuit, not represented, comprises the switches 88 and 89 secured to a ledger 90 of the frame 67.

The operation of the device represented in FIG. 3 will now be described, starting from the position illustrated in said figure.

In the position shown in FIG. 3, the carriage 69 is moving to the right, dragged into motion by the chain 84, with which it engages through the clamp 77, which is closed; the tight clamping means 73 is closed and the tight clamping means 74 is open.

The appendix 78 of carriage 69, moving to the right, actuates with its end the switch 89.

The actuation of the switch 89 originates the closure of the tight clamping means 74 and, after an interval, the opening of the tight clamping means 73.

The actuation of the switch 89 causes moreover the opening of the clamp 77, which disengages the carriage 69 from the chain 84, so that the cylinder/piston system 80 enters into action, moving the carriage rapidly to the left (FIG. 3).

The carriage 69, reaching its stroke end in its motion to the left, actuates the switch 88 which causes the immediate closure of the tight clamping means 73, the opening, after an interval, of the tight clamping means 74 and, after a further interval, the clamping of the clamp 77 on the chain 84, so that the carriage 69 moves to the right.

At this moment the above described operating cycle is restarted.

The above description indicates two different embodiments, and the respective operations, of sealing devices according to the present invention, situated at the inlet openings of the curing unit, since the sealing devices situated at the outlet openings are equal to them.

Said sealing devices, arranged at the inlet opening or at the outlet opening of the curing unit, can be connected together either mechanically or electrically, so that the material to be cured enters at the same speed at which it outcomes from the unit, or enters it at a speed lower than its discharge speed, permitting to subject the material to a stretching action while this is being cured, or enters it at a speed higher than its discharge speed, in order to exert an action of compression on the material while this is cured.

Although some preferred embodiments of the present invention have been described and illustrated, it is understood that it includes any other alternative embodiment accessible to a technician of this field.

For instance, the present invention includes mechanical means different from those illustrated and described for the movement of the carriages, provided however that they have the same kinematic effects, and also means, other than the admission of air under pressure, for the expansion of the flexible sleeve, it being possible to use in this connection mechanical means connected to it, and different systems to tightly connect mutually the tubular bodies, using for instance deformable bellows.

What is claimed is:

1. Sealing device for hot fluid curing units used to cure elongated elements as tubes, structural shapes and the like, which comprises at the inlet and outlet opening of the curing unit at least two coaxial tubular bodies, one of said tubular bodies being secured to any opening of the curing unit and the other tubular body being tightly slidable in the first with an alternative telescopic movement, each of said tubular bodies being provided with an element for tightly locking the elongated element to be cured, whereby the passage of said elongated element in the curing unit takes place without rubbing against part of said curing unit.

2. A sealing device as in claim 1, wherein the means for tightly connecting the pair of tubular bodies with the curing unit are means which allow a tight relative sliding of said tubular bodies and in that means are provided for moving the two tubular bodies independently of each other with respect to the curing unit.

3. A sealing device as in claim 1, wherein the removable clamping means incorporated in each tubular body are pneumatic and comprise a rigid sleeve with associated means for tightly connecting it to the inner wall of the tubular body, a duct passing through the thickness of the rigid sleeve and opening at the outside of the tubular body, a flexible sleeve which can be radially enlarged and is longitudinally inextensible, permanently inserted inside the rigid sleeve and connected to the latter in order to create a hollow space between said two sleeves, and means for supplying through a duct a fluid under pressure in said hollow space and for discharging it therefrom.

4. A sealing device as in claim 3, wherein the means for tightly connecting the rigid sleeve to the inner wall of the tubular body consist of an annular member which embraces the rigid sleeve and constitutes a single piece with it, whilst the outer contour of said annular member is rigidly connected to the tubular body, and in that the radially enlargeable and longitudinally inextensible sleeve consists of a portion of tube of elastomeric material, in whose wall are incorporated longitudinal inextensible threads, said portion of tube having its ends turned up about the outer tubular surface of the rigid sleeve and secured to it.

5. A sealing device as in claim 1, wherein the means for moving and guiding each tubular body with respect to the curing unit comprise a carriage to which the tubular body is fast, guiding rails for the motion of the carriage, a clamp with actuation means, secured to the carriage, a motor-operated chain to which the clamp is engaged or disengaged, and an appendix fast with the carriage, which acts on the switches of an electric circuit controlling the operation of the device.

6. In an apparatus for curing an elongated elastomeric article, said apparatus having a container for hot fluid and an inlet opening and an outlet opening for passage of said elongated article through the container, means for sealing each of said openings comprising
 a first tubular member,
 a second tubular member coaxial with the first and connected at one end in a fluid tight seal to one of said openings and telescopically slidably disposed in a first end of the first tubular member, means for forming a fluid tight seal between the overlapping parts of the first and second tubular members,
 a means for slidably supporting the elongated article in the first tubular member comprising a rigid sleeve coaxially disposed in the first tubular member and having a bore which is of greater cross-section at one point spaced longitudinally from each end thereof than at either end, conduit means for introducing fluid under pressure into the bore at the point of greater cross-section, a flexible sleeve disposed within the bore of the rigid sleeve and forming a fluid tight liner for the bore of the rigid sleeve and over said conduit means, said liner having a cross-section which adapts it to contract under fluid pressure in the conduit means about an elongated article extending therethrough, a rigid tubular member coaxial with the first tubular member and attached to a second end of said first tubular member in a fluid tight seal, a third tubular member having an exit end for the elongated article and an opposite end telescopically slidably disposed about an end of said first tubular member, said third tubular member being coaxial with said first tubular member, means for sealing the overlapping portions of said first and third tubular members, a means for slidably supporting an elongated article in the third tubular member comprising a rigid sleeve coaxially disposed in the first tubular element and having a bore which is of greater cross-section at a point spaced longitudinally from each end thereof than at either end, conduit means for introducing fluid under pressure into the bore at the point of greater cross-section, a flexible sleeve disposed within the bore of the rigid sleeve and forming a fluid tight liner for the bore of the rigid sleeve and over said conduit means, said liner having a cross-section which adapts it to contract under fluid pressure in the conduit means about an elongated article therein, means for supporting said first tubular member and for moving it longitudinally to and from the second tubular member, and means for supporting the third tubular member and for moving it longitudinally to and from the first tubular member.

* * * * *